(12) United States Patent
Lang et al.

(10) Patent No.: US 7,383,905 B2
(45) Date of Patent: Jun. 10, 2008

(54) VEHICLE COOLING SYSTEM

(75) Inventors: Mattias Lang, Zeutern (DE);
Christopher A. Bering, Dike, IA (US)

(73) Assignee: Deere & Company, Moline, IL (US)

( * ) Notice: Subject to any disclaimer, the term of this patent is extended or adjusted under 35 U.S.C. 154(b) by 53 days.

(21) Appl. No.: 11/500,133

(22) Filed: Aug. 7, 2006

(65) Prior Publication Data

US 2006/0266309 A1    Nov. 30, 2006

(51) Int. Cl.
  *B60K 11/00*    (2006.01)
  *B60K 13/02*    (2006.01)
  *B60K 11/04*    (2006.01)

(52) U.S. Cl. .................. 180/68.1; 180/68.3; 180/68.4; 180/68.6

(58) Field of Classification Search .............. 180/68.1, 180/68.3, 68.4, 68.6
See application file for complete search history.

(56) References Cited

U.S. PATENT DOCUMENTS

| | | | | |
|---|---|---|---|---|
| 4,071,009 A | * | 1/1978 | Kraina | 123/198 E |
| 4,114,714 A | * | 9/1978 | Fachbach et al. | 180/68.1 |
| 5,410,992 A | * | 5/1995 | Hunt et al. | 123/41.49 |
| 5,551,505 A | * | 9/1996 | Freeland | 165/41 |
| 6,302,228 B1 | * | 10/2001 | Cottereau et al. | 180/68.1 |
| 6,871,697 B2 | * | 3/2005 | Albright et al. | 165/51 |
| 6,883,589 B2 | * | 4/2005 | Ozawa et al. | 165/41 |
| 7,051,786 B2 | * | 5/2006 | Vuk | 165/41 |
| 7,089,994 B2 | * | 8/2006 | Esposito et al. | 165/42 |
| 7,128,178 B1 | * | 10/2006 | Heinle et al. | 180/68.4 |
| 7,134,518 B2 | * | 11/2006 | Arai et al. | 180/68.1 |
| 7,296,645 B1 | * | 11/2007 | Kerner et al. | 180/68.1 |
| 2002/0088655 A1 | * | 7/2002 | Falk et al. | 180/68.3 |
| 2003/0183432 A1 | * | 10/2003 | Suzuki | 180/68.1 |
| 2005/0029027 A1 | * | 2/2005 | Kunikata et al. | 180/68.1 |
| 2005/0217907 A1 | * | 10/2005 | Madson et al. | 180/68.1 |
| 2006/0006012 A1 | * | 1/2006 | Khouw et al. | 180/68.3 |

* cited by examiner

*Primary Examiner*—Christopher Ellis
*Assistant Examiner*—John R Olszewski

(57) ABSTRACT

A cooling system is provided for a vehicle having an engine. The cooling system includes an engine cooling radiator positioned in front of the engine, a radiator fan for moving air through the radiator, a duct fro conducting air blown through the radiator, and a pair of subsystem heat exchangers, each with an electric motor driven fan. The duct has a forward opening inlet receiving warmed air from the radiator, a housing extending substantially upwardly from the inlet to an upwardly opening outlet. The heat exchangers are positioned higher than the radiator, and adjacent to and in front of the outlet of the duct. The radiator fan may be mounted in front of the radiator, or it may be mounted inside the duct outlet. An air cleaner unit may be positioned higher than and forward of the radiator and lower than the heat exchangers.

13 Claims, 3 Drawing Sheets

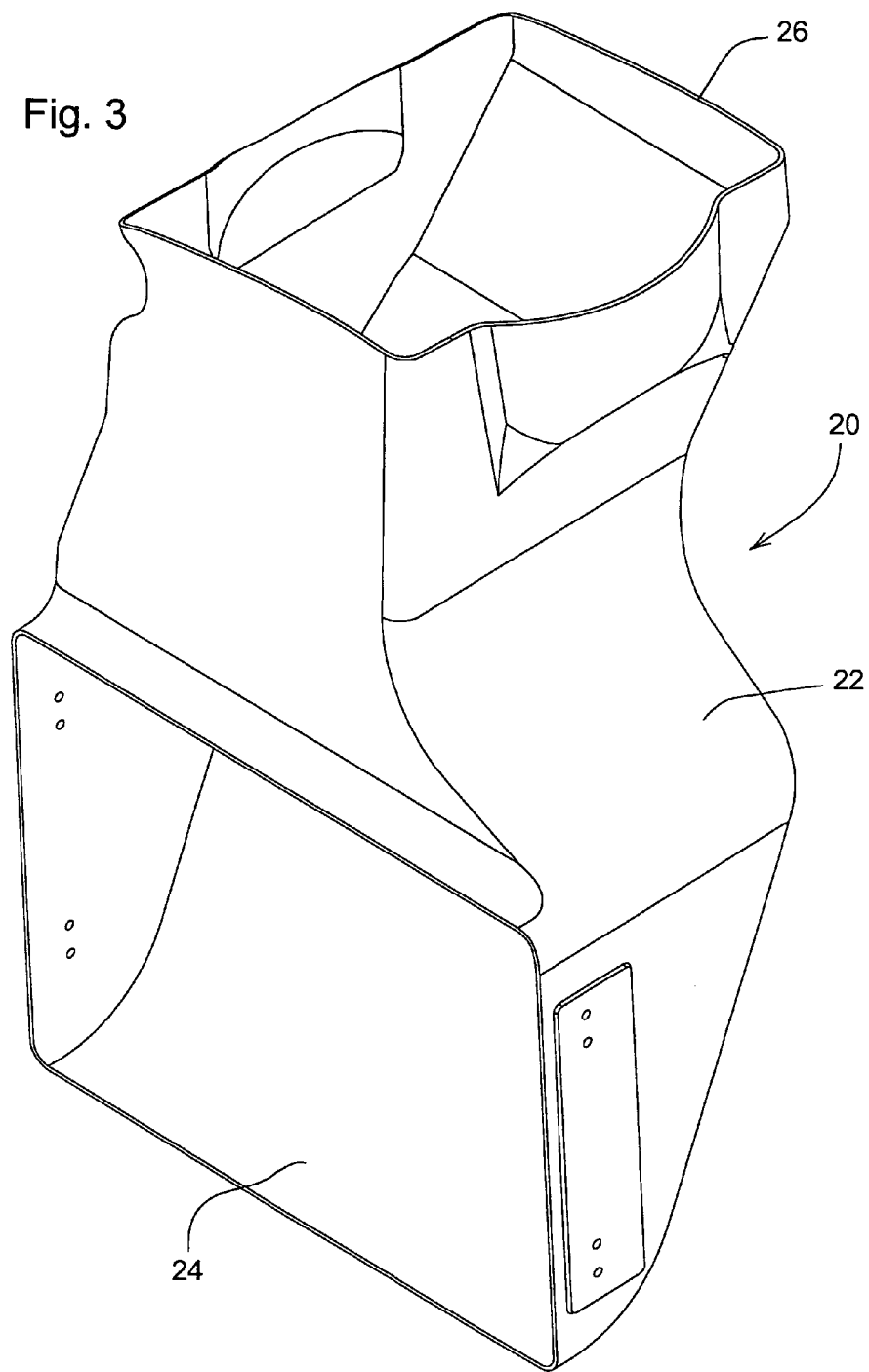

VEHICLE COOLING SYSTEM

BACKGROUND

The present invention relates to a cooling system for an off-road work vehicle which is powered by an internal combustion engine, such as an agricultural tractor.

In conventional vehicle cooling systems heat exchangers are arranged in series. This requires the air to pass through all the heat exchangers to meet an individual cooler's needs. This arrangement, which typically uses a mechanically driven fan to pull the air through the heat exchangers, also limits the area through which the air must pass. This is inefficient.

An advance vehicle cooling system, such as an agricultural tractor having an engine with a horizontally oriented rotation axis and a hood covering the engine is described in U.S. patent application Ser. No. 10/617,612 filed 11 Jul. 2003 and assigned to applicant's assignee. This cooling system includes an engine cooling radiator positioned above the engine and between the engine and the hood and a fan unit with electric motor-driven fans blowing air upwardly through the radiator. The fan unit is positioned above the engine and between the engine and the radiator. An engine charge air cooler is also positioned above the engine and between the engine and the hood, and a charge air cooler fan unit has electric motor-driven fans which blow air upwardly through the cooler. The hood has openings in its upper surface through which passes air blown by the radiator fan unit and the charge air cooler fan unit. This cooling system blows heated cooling air vertically upwardly, thus preventing the heated cooling air from being drawn back into the intakes of the cooling system and preventing heated air from being blown onto the exterior of the tractor cab.

However, in this system the air inlets and outlets are close enough together that they can compete for common air. Cooling air for the forward cooling components can flow over surfaces where it may be heated prior to entering the heat exchanger. Also, not all heated air is exhausted vertically, because the oil cooler and AC condenser are mounted behind the engine so that the heated air from these units is discharged laterally.

Another advanced vehicle cooling system is described in U.S. patent application Ser. No. 11/221,602 filed 8 Sep. 2005 and also assigned to applicant's assignee. This design requires that the air cleaner be located rearwardly with respect to the radiator and heat exchangers, and requires that the air cleaner be partially enclosed between left and right portions of the duct which receives air from the heat exchangers.

It is desired to provide a vehicle cooling systems with more flexibility, and which is efficient and cost competitive. Such systems should reduce recirculation, reduce fan power consumption, reduce or eliminate mechanical ties to the engine, and provide improved control capability.

SUMMARY

Accordingly, an object of this invention is to provide a flexible vehicle cooling system.

A further object of this invention is to provide a vehicle cooling system wherein the air inlets and outlets do not compete for common air.

A further object of the invention is to provide such a cooling system which permits an air cleaner inlet to be located near the front of the vehicle.

A further object of the invention is to provide such a cooling system wherein all heated air is exhausted vertically.

These and other objects are achieved by the present invention, wherein a cooling system is provided for a vehicle having an engine. The cooling system includes an engine cooling radiator positioned in front of the engine, a radiator fan for moving air through the radiator, a duct, and at least one heat exchanger for cooling a subsystem of the vehicle. The duct has a forward opening inlet receiving warmed air from the radiator, and a housing extending substantially upwardly from the inlet to an upwardly opening outlet. The outlet is located rearwardly of the inlet and is forward of and higher than the engine.

A pair of subsystem heat exchangers are positioned above the radiator, and adjacent to and in front of the outlet of the duct. One of the heat exchangers is positioned adjacent to and in front of the other heat exchanger. The radiator fan may be positioned in front of the radiator, or it may be received in the outlet of the duct. An engine air cleaner unit is positioned higher than the radiator, lower than the heat exchanger and forward of the radiator. Air moving unit blow air upwardly through the heat exchangers.

BRIEF DESCRIPTION OF THE DRAWINGS

FIG. 3 is a perspective view of a duct component of FIGS. 1 and 2.

DETAILED DESCRIPTION

Figure 1:
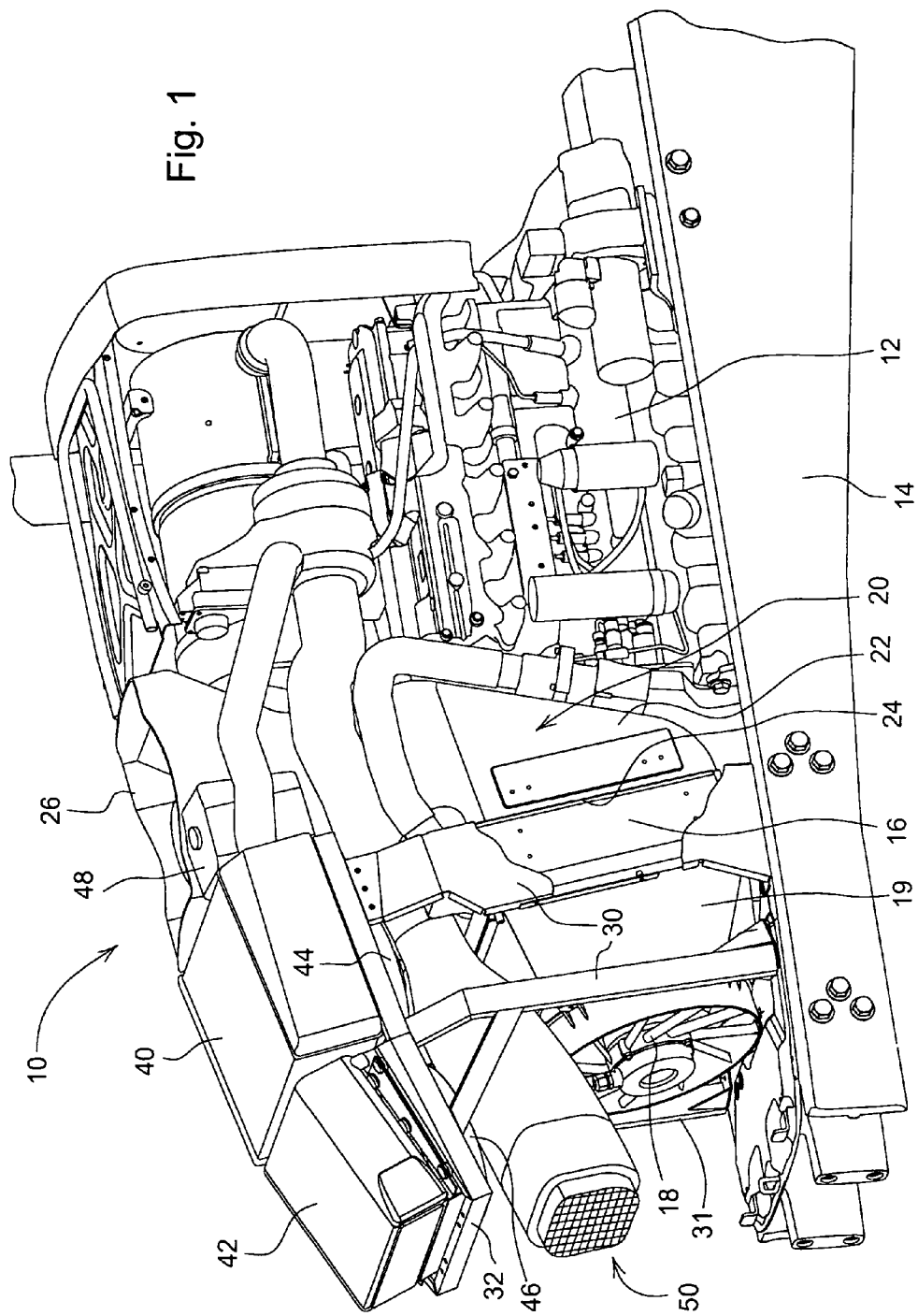
FIG. 1 is a perspective view of a vehicle cooling system component arrangement according to one embodiment of the present invention.

Referring to FIG. 1, a cooling system 10 is provided for a vehicle (not shown), having a front oriented engine 12 mounted on a frame 14. The cooling system 10 includes a main vertically oriented engine cooling radiator 16 mounted on the frame 14 spaced apart and in front of the engine 12. A radiator fan 18 is mounted in front of the radiator 16 and blows air rearwardly through the radiator 16. A shroud 19 extends between fan 18 and radiator 16.

The assembly or system 10 also includes a duct unit 20. Duct 20 is supported by brackets 30 which extend upwardly from the sides of the frame 14. As best seen in FIG. 3, the duct 20 includes a hollow housing 22 with a front lower end which forms a forward facing front opening 24. The housing extends substantially upwardly to an upward facing outlet 26.

The cooling system 10 also includes a pair of heat exchangers for cooling vehicle subsystems, such as a charge air cooler 40 and an oil cooler 42. Coolers 40 and 42 are adjacent to each other, one in front of the other, are mounted generally above the fan 28 and radiator 16, and are supported by brackets 30 and 31 which support a cooler frame 32.

An electric motor driven air moving unit 44 blows cooling air upwardly through cooler 40. An electric motor driven air moving unit 46 blows cooling air upwardly through cooler 42. Air moving units 44 and 46 are mounted below the coolers 40 and 42, respectively. The air moving units 44 and 46 may be blowers, fans or mixed flow units. A conventional radiator de-aeration tank 48 may be located behind the left side of the cooler 40 and adjacent a front portion of the outlet 26 of duct 20.

An engine air cleaner 50 is preferably located higher and in front of the radiator 16 (and/or fan 18), and lower than heat exchangers 40 and 42. As a result, engine intake air can be drawn into air cleaner 50 and then into other engine air intake components (not shown).

Figure 2:
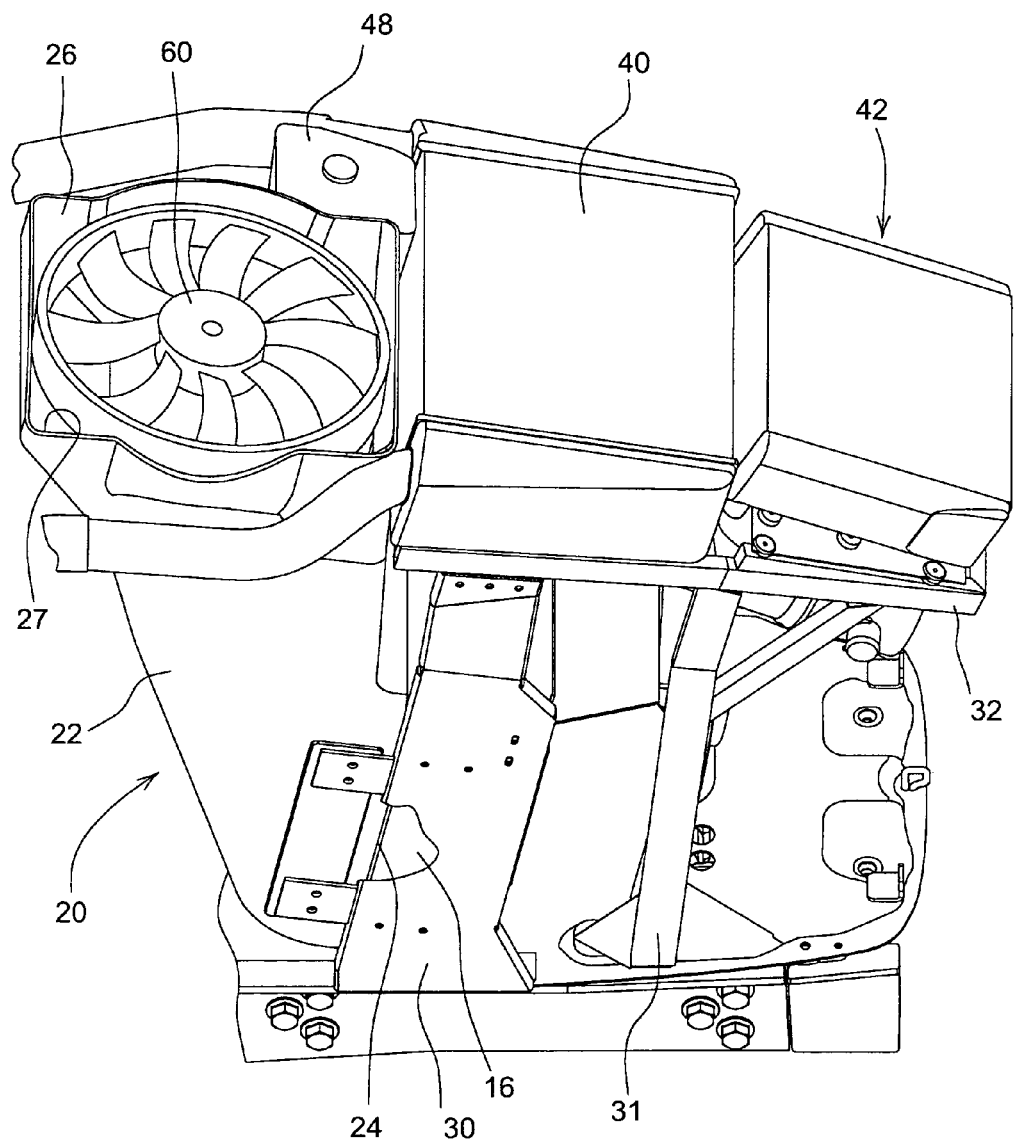
FIG. 2 is a perspective view of a vehicle cooling system component arrangement according to another embodiment of the present invention.

Referring now to FIG. 2, an alternate embodiment is shown wherein there is no fan or shroud in front of the radiator 16. Instead, radiator fan 60 is mounted in and received by the outlet 26 of duct 20. Fan 60 is preferably driven by an electric motor (not shown) and blows air upwardly, and as a result, pulls cooling air rearwardly through radiator 16 and upwardly through-duct 20. The engine air cleaner 50 is located above and in front of the radiator 16 and below heat exchangers 40 and 42. The fan 60 may be received by the outlet 26 as shown in FIG. 2, or part or all of the fan 60 may be located above a top edge 27 of the duct 20.

In both embodiments, the elements shown and described are preferably covered by a conventional hood (not shown) with ports or openings aligned with the radiator 16, the air cleaner 50, coolers 42 and 44, and with outlet 26 of duct 20. The radiator fans 18 and 60 are preferably driven by electric motors (not shown). Each of the single large radiator fans 18 and 60 could be replaced with two smaller fans (not shown).

Thus, the radiator fan may be located at either end of the duct 20. In both embodiments the main engine radiator 16, for cooling the engine 12, is positioned in front of the front portion of duct 20. The radiator 16 is positioned below and forward of the outlet 26 of duct 20. The outlet 26 has a vertical position which is higher than an upper surface of the engine 12.

In operation, heated cooling air from radiator 16 enters into inlet 24 of duct 20, flows through duct 20 and is discharged upwardly through outlet 26. Heated cooling air from coolers 40 and 42 flows upwardly and away from the assembly 10 of cooling system components.

As a result, cooling air for the coolers 40 and 42 does not flow over any surfaces where it may be heated prior to entering the coolers 40 and 42. Also, all heated air is exhausted vertically from coolers 40, 42 and radiator 16. As a result, air from a separate region is drawn into each separate heat exchanger or cooler, and there is little interference or co-mingling between discharged heated air and cooling air being blown into the various coolers and heat exchangers.

With electric driven fans, instead of mechanical engine-driven fans, the fans and coolers can be optimally located so as to permit the incorporation of after treatment (exhaust) components required by future regulations, and so as to locate the heat exchanger close to the heat sources, which reduce plumbing losses and improves efficiency. Also with this system, cooling air can now be controlled and moved through each separate heat exchanger based on that unit's particular demand.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

Assignment

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

We claim:

1. A cooling system for a vehicle having an engine, the cooling system comprising:
   an engine cooling radiator positioned in front of the engine;
   a radiator fan for moving air through the radiator;
   a duct having a forward opening inlet receiving warmed air from the radiator, a housing extending substantially upwardly from the inlet to an upwardly opening outlet, the outlet being located rearwardly of the inlet, forward of the engine and higher than the engine; and
   a first heat exchanger for cooling a subsystem of the vehicle, the first heat exchanger being positioned higher than the radiator, and adjacent to and in front of the outlet of the duct.

2. The cooling system of claim 1, wherein:
   the radiator fan is received in a portion of the duct.

3. The cooling system of claim 2, wherein:
   the radiator fan is received in the outlet of the duct.

4. The cooling system of claim 1, wherein:
   the radiator fan is mounted in front of the radiator and blows air rearwardly through the radiator.

5. The cooling system of claim 1, wherein:
   an air cleaner unit is connected to an air intake of the engine, and the air cleaner unit is positioned higher than the radiator and lower than the first heat exchanger.

6. The cooling system of claim 1, further comprising:
   a first air moving unit for blowing air upwardly through the first heat exchanger.

7. The cooling system of claim 1, further comprising:
   a second heat exchanger for cooling a second subsystem of the vehicle, said second heat exchanger being positioned adjacent to and in front of the first heat exchanger.

8. The cooling system of claim 1, further comprising:
   a second heat exchanger for cooling a second subsystem of the vehicle, said second heat exchanger being positioned adjacent to and in front of the first heat exchanger; and
   a second air moving unit for blowing air through the second heat exchanger.

9. The cooling system of claim 8, wherein:
   the first and second air moving units blow air upwardly through the respective first and second heat exchangers.

10. The cooling system of claim 5, wherein:
    the air cleaner unit has a front end which is positioned forward of the inlet of the duct.

11. The cooling system of claim 1, wherein:
    an air cleaner unit is connected to an air intake of the engine, and the air cleaner unit is positioned higher than the radiator and lower than the first heat exchanger;
    the radiator fan is mounted in front of the radiator and blows air rearwardly through the radiator; and
    the air cleaner unit has a front end which is positioned forward of a front end of the radiator fan.

12. The cooling system of claim 1, wherein:
    the first heat exchanger comprises a charge air cooler.

13. The cooling system of claim 1, wherein:
    the first heat exchanger comprises an oil cooler.

* * * * *